Sept. 19, 1933.  P. BADGER  1,927,731
ICE TONGS
Filed Dec. 14, 1932
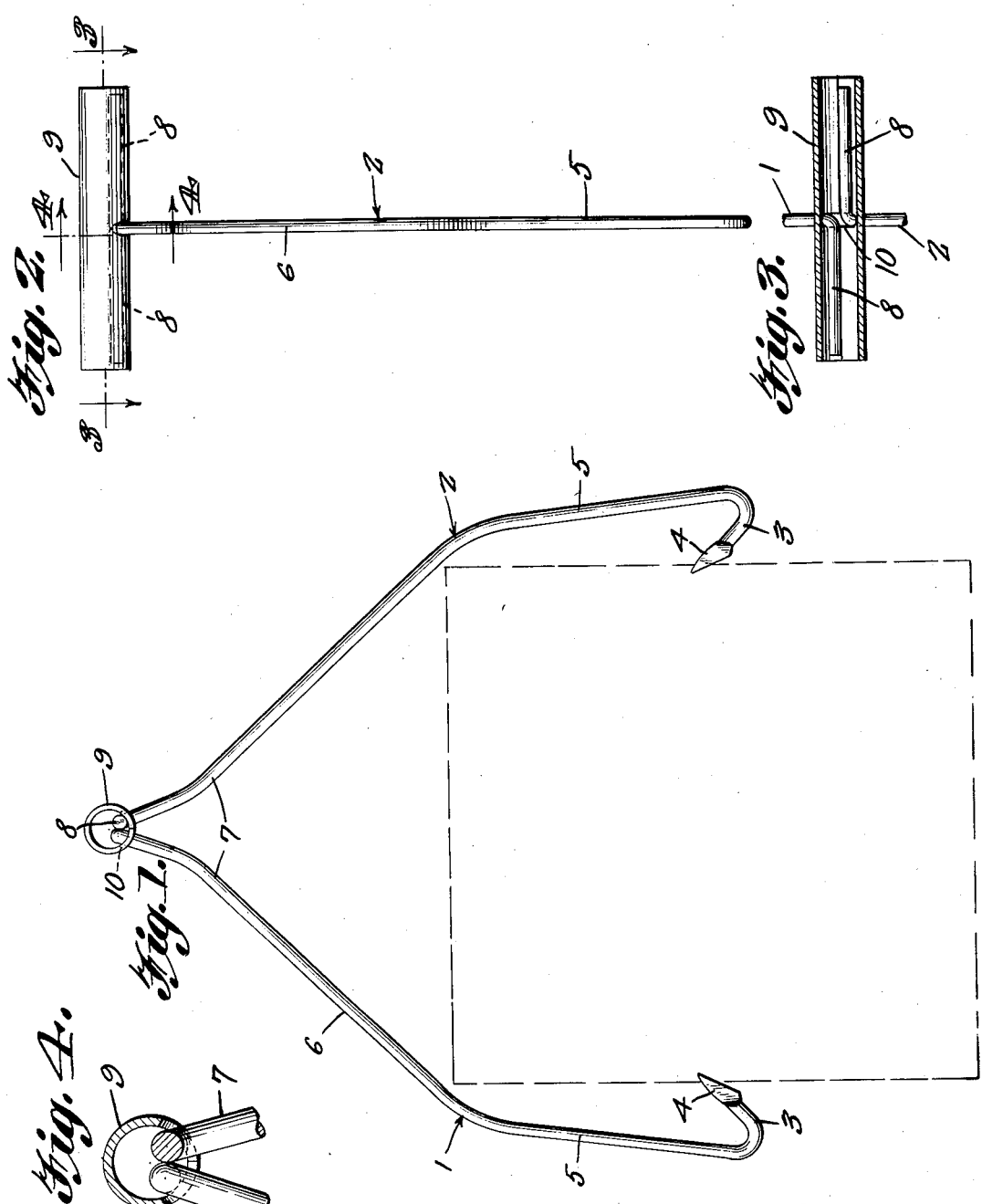

Patented Sept. 19, 1933

1,927,731

UNITED STATES PATENT OFFICE 1,927,731

ICE TONGS

Pat Badger, Drumright, Okla.

Application December 14, 1932
Serial No. 647,261

2 Claims. (Cl. 294—106)

This invention relates to tongs and its general object is to provide tongs that are positive in their clamping action and are capable for use in handling and carrying ice in an easy and expeditious manner with very little effort.

Another object of the invention is to provide ice tongs that include a comfortable gripping handle, that is self-adjusting, simple in construction, inexpensive to manufacture and extremely efficient in operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a view illustrating my tongs in use.

Figure 2 is a side view thereof.

Figure 3 is a sectional view taken approximately on line 3—3 of Figure 2, looking in the direction of the arrows.

Figure 4 is a sectional view taken approximately on line 4—4 of Figure 2, looking in the direction of the arrows.

Referring to the drawing in detail, it will be noted that my tongs include a pair of cooperating members 1 and 2 each of which are preferably formed from rod like material, in that they are round in cross section, with the exception of their ice receiving ends which will be presently described.

The cooperating members have their lower ends curved upwardly upon themselves as at 3, and the upwardly curved portions are inclined inwardly and terminate in substantially spear like penetrating members 4 which are of course adapted to bite or penetrate the sides of a cake of ice as clearly shown in Figure 1.

From the upwardly curved portions 3, the members 1 and 2 extend in substantially parallelism with respect to each other, and from the substantial parallel portions 5, the members 1 and 2 extend in converging relation with respect to each other. The converging portions which are indicated by the reference numeral 6 are bent slightly to provide relatively short inclined portions 7, and the members 1 and 2 are further bent at their upper ends in opposed directions to provide arms 8 that are disposed at right angles with respect to the inclined portions 7, as best shown in Figure 2.

The handle for my tongs is in the form of a sleeve that is indicated by the reference numeral 9, and this sleeve is circumferentially slotted midway its ends as at 10 for the purpose of receiving the arms 8 that not only extend through the sleeve in opposed directions with respect to each other, but terminate adjacent the ends of the sleeve as clearly shown in Figure 3.

The slot 10 is of a size to allow for the free movement of the cooperating members toward and away from each other, and so that the tongs are capable of receiving a relatively large piece of ice, which can be conveniently carried due to the particular shape of handle as it will be obvious that the sleeve will function to not only hold the cooperating members 1 and 2 associated, but provides a comfortable gripping surface due to its shape.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. Ice tongs comprising a pair of cooperating members, upwardly curved portions formed with the lower ends thereof and being directed inwardly at an inclination, spear like penetrating members formed with the free ends of the upwardly curved portions, arms formed at right angles with the upper ends of the cooperating members and being disposed in opposed directions with respect to each other, a handle slotted midway its ends to receive the members with the arms arranged therein and said handle holding the members in cooperative association.

2. Ice tongs comprising a pair of cooperating members, upwardly directed penetrating means formed with the lower ends of said members, arms arranged at right angles with respect to the upper ends of said members and being disposed in opposed directions with respect to each other, and a sleeve slotted circumferentially midway its ends to receive said members therethrough with the arms disposed within the sleeve and terminating adjacent the outer ends thereof, and said sleeve acting as a handle for said tongs.

PAT BADGER.